United States Patent [19]
Bois

[11] Patent Number: 5,448,821
[45] Date of Patent: Sep. 12, 1995

[54] METHOD FOR THE MANUFACTURE OF A WAVEGUIDE

[75] Inventor: Arnaud Bois, Montrouge, France

[73] Assignee: Thomson-CSF, Paris, France

[21] Appl. No.: 150,447

[22] Filed: Nov. 10, 1993

[30] Foreign Application Priority Data

Nov. 24, 1992 [FR] France .................. 92 14081

[51] Int. Cl.⁶ ............................................. B21C 37/30
[52] U.S. Cl. ..................................... 29/600; 72/370
[58] Field of Search ............... 72/75, 113, 370; 29/600, 406

[56] References Cited

U.S. PATENT DOCUMENTS

| | | | |
|---|---|---|---|
| 3,066,557 | 12/1962 | Stevens | 72/75 |
| 3,763,543 | 10/1973 | Strauch et al. | 72/113 |

FOREIGN PATENT DOCUMENTS

| | | |
|---|---|---|
| 0082519 | 6/1983 | European Pat. Off. |
| 2470455 | 5/1981 | France |
| 2536590 | 5/1984 | France |
| 1049454 | 1/1959 | Germany |
| 56413 | 4/1985 | Japan ........................ 72/370 |

OTHER PUBLICATIONS

Soviet Inventions Illustrated, Section Ch: Chemical, Week B02, 594,192 Issued Feb. 21, 1979, p. 129.

*Primary Examiner*—Lowell A. Larson
*Attorney, Agent, or Firm*—Meltzer, Lippe, Goldstein et al.

[57] ABSTRACT

Disclosed is a method for the manufacture of a waveguide or a part of a waveguide from a casting, said waveguide comprising at least one part along which two parts of walls of the waveguide, a first part and a second part, must remain parallel to each other, with a spacing between them that is equal to a distance X with a tolerance value of x, the caster's tolerance value for the dimension X being f, wherein the part coming from the casting process is conformationally shaped with at least one of its first or second walls comprising embossed features, and wherein these embossed features are reduced by passes with a tool that is pushed or drawn in parallel to the first and second walls. FIG. 1.

5 Claims, 3 Drawing Sheets

X = 15
f/2 = 0,20
f/2+e = 0,25

METHOD FOR THE MANUFACTURE OF A WAVEGUIDE

BACKGROUND OF THE INVENTION

1. Field of the Invention

The invention relates to the field of methods for the manufacture of electromagnetic waveguides. It can be used for any waveguide, but is particularly suited to non-rectilinear waveguides, especially certain antennas designed in the form of waveguide radiators.

2. Description of the Prior Art

It is known that, owing to dimensional tolerances, the idea of manufacturing such waveguides directly by casting has had to be given up. The casting tolerances, which are at best in the range corresponding to the JS13 or JS14 standards, cannot give the dimensional precision required for a waveguide. These castings therefore have to be machined to bring them to the exact dimensions desired. This entails substantial costs. Similarly, attempts have been made to obtain waveguides directly by casting through operations for the selection of the stripped-out waveguides. Reject rates of the order of 70% make the operation uneconomical.

The aim of the invention is to make waveguides out of castings. It is aimed at simplifying the intermediate operations to be carried out between the rough-cast waveguide and the finished waveguide.

To this end, according to the present invention, it is provided that the casting will be given a shape that will make it possible, by simple chasing or peening of material, burnishing or rolling, possibly in certain cases abrasion by a conformationally shaped tool or broaching to obtain the finished waveguide directly.

It is known that a waveguide is a sort of pipe whose cross-section is, for example, a rectangle or a circle. The invention here below will be described for a rectangular-sectioned waveguide but the explanations given will enable the invention to be easily transposed to any other shape of waveguide. The rectangular sectioned waveguides have a large side with a length a and a small side with a length b.

It is generally sought to obtain a single mode of propagation of the wave, known as the transverse mode TE 10. To this end, the lengths a and b must verify the relationship:

$$b < \frac{\lambda}{2} < a$$

an expression in which $\lambda$ designates the wavelength of the waveguide. The value generally taken is $a=\lambda\sqrt{2}$. Furthermore, in order to limit the losses in the waveguide, the state of the surface should be such that the differences between the bumps and the hollows do not exceed $\lambda/4$, which is the boundary value. In practice it is sought to limit these differences to $\lambda/8$ or even $\lambda/10$. Thus, for a waveguide working in the 20 GHz band, i.e. with 15 mm wavelengths, the differences between hollows and bumps will be limited to 20 tenths or at best to 15 tenths of a millimeter.

To meet this condition, according to the invention a molding operation will be used to create a surface state comprising bumps and hollows, and then the material of the bumps will be chased into the hollows. Since these are longitudinal elements, the bumps and the hollows will, in most cases, have shapes that are also longitudinal. They will be grooves whose cross-sections could have trapezoidal, triangular, rectangular or undulating shapes. The dimensions of the hollows and bumps shall now be explained. Let X be the size to be obtained with a tolerance value of x. This will be the size, for example, of the large side of a rectangular waveguide. In this example, it will be assumed that the final size is obtained by the chasing of material. The size X is a size corresponding to a female element, i.e. if the real size Xr is smaller than X, then it is necessary to remove or chase material in order to obtain the size X. In a known way, the chasing of material should be done on a minimum thickness e of material. The caster's tolerance value is f. With these designations, the minimum distance between facing bumps to be given to the caster will be equal to:

$$CF\,Min = X + x - e - f$$

The maximum distance between bumps will therefore be:

$$CF\,Max = X + x - e$$

The method is applicable only if $f > x$. If not, it would mean that a rough casting is enough.

SUMMARY OF THE INVENTION

Briefly, the invention pertains to a method for the manufacture of a waveguide or a part of a waveguide from a casting, said waveguide comprising at least one part along which two parts of walls of the waveguide, a first part and a second part, must remain parallel to each other, with a spacing between them that is equal to a distance X with a tolerance value of x, the caster's tolerance value for the dimension X being f, wherein the part coming from the casting process is conformationally shaped with at least one of its first or second walls comprising embossed features, and wherein these embossed features are reduced by passes with a tool that is pushed or drawn in parallel to the first and second walls.

In the case of a rectangular waveguide, the parts of walls that have to remain parallel to each other are constituted by the faces constituting the small sides of the rectangle and/or the faces constituting the large sides of the rectangle. In the case of a circular waveguide, the faces that have to remain parallel to each other are constituted by diametrically opposite face parts, the dimension X then being the diameter of the waveguide. Preferably, in order to reduce the cost of the casting mold, the embossed features are constituted by longitudinal bumps whose longitudinal lines are parallel to the walls. The tools used to reduce the bumps may be, as indicated further above, any tool known in the prior art.

BRIEF DESCRIPTION OF THE DRAWINGS

Further explanations relating to the definition of the terms used and to a particular exemplary embodiment shall be given here below with reference to the appended drawings, wherein.

MORE DETAILED DESCRIPTION

Figure 1:
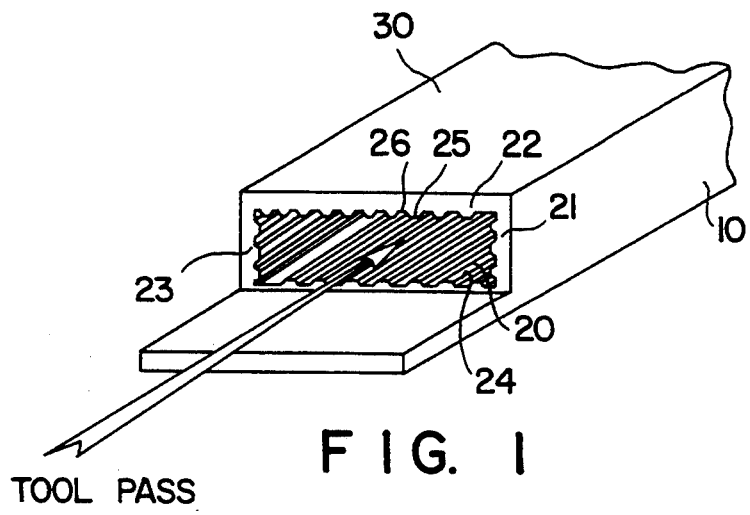
FIG. 1 shows an exemplary rough casting designed to form a waveguide.
Figures 2A, 2B:
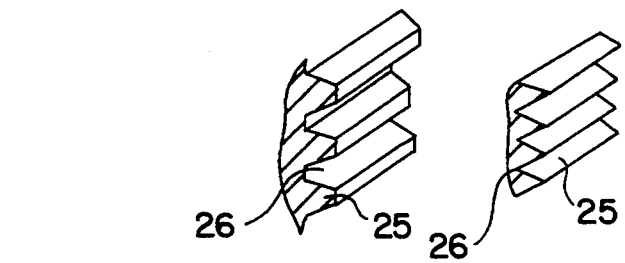
FIGS. 2a to 2e show non-restrictive examples of shapes of bumps and grooves.
Figures 2C, 2D:
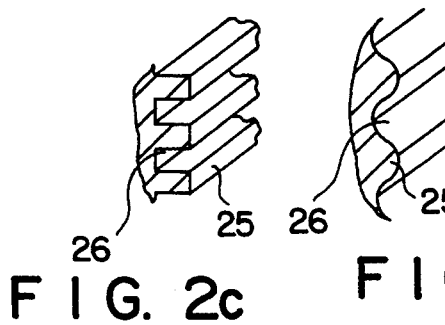
Figure 2E:
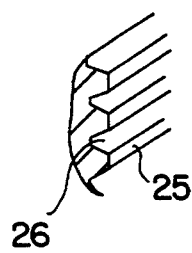

FIG. 1 shows an example of a casting 10 out of which it is possible to make a waveguide according to the invention. It has a shape for making a rectangular waveguide. The casting 10 is a longitudinal casting with an external surface 30 and an internal surface 20.

As far as the invention is concerned, the external shape is unimportant. The shape of the internal surface 20 has been shown with its four faces 21, 23 for the faces of the small sides and 22, 24 for the faces of the large sides, covered with longitudinal grooves and bumps. The term "grooves" designates the hollow part between two bumps, and the term "bump" designates the embossed part between two grooves. The grooves or bumps are said to be longitudinal in the sense that they follow a fictitious parallel line that is located at equal distance from the four walls and that constitutes an axial line of the waveguide. This line may be curved or straight. Possible examples of shapes of associated grooves and bumps have been shown in FIG. 2. The bumps are designated by the general reference number 25 and the grooves by the general reference number 26. FIGS. 2a to 2e thus show bumps whose cross-section has the shape of a trapezoid, a triangle, a rectangle or an undulation, or has a combined shape. For the last-named example, the tip of the bump is a straight-line segment and the two lateral sides have curved shapes.

These curved shapes are the ones most frequently encountered, because angular shapes are more easily subject to defects, notably because of missing material.

Figure 3A:
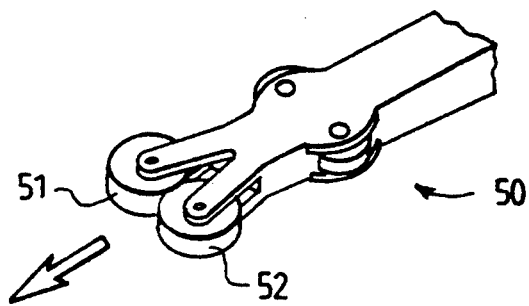
FIGS. 3a to 3e show examples of tools for the processing of castings.
Figure 3B:
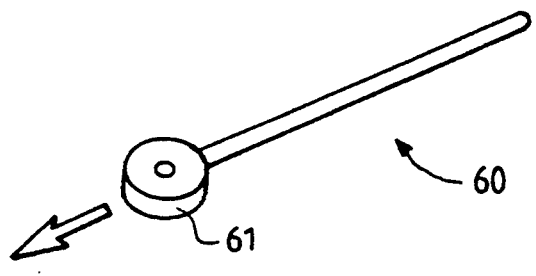
Figure 3C:
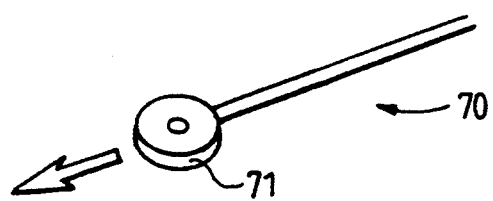
Figure 3E:
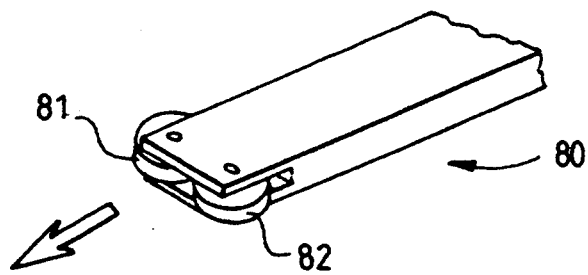
Figure 3D:
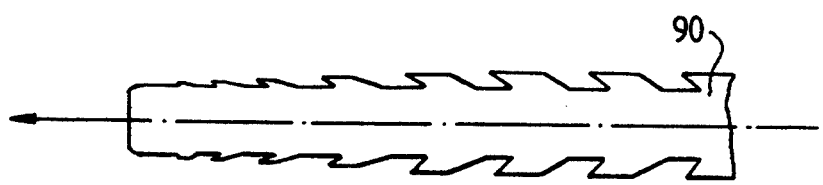

These bumps 25 are then crushed or peened or subjected to abrasion or broaching by means of tools known in the prior art and shown in FIGS. 3a to 3e. The shapes shown in these figures are appropriate for the conformational shaping of the small sides of rectangular waveguides. This is why the tools shown in these figures are roller-shaped. This shape is, of course, not restrictive. In particular, if circular waveguides were involved, the tools would be spherical. With the exception of the broach 90, shown in FIG. 3d, which acts only by removing the material of the bumps, the other tools 50, 60, 70, 80 act by changing the shape of the bumps by means of rollers, 51, 52, 61 as shown in FIGS. 3a and 3b or by deformation or abrasion by means of abrasive pellets 71, 81, 82 as shown in FIGS. 3c and 3e. These techniques are all well known in the prior art and the tools as well as their modes of drawing or pushing shall not be described any further. Two particular exemplary embodiments shall now be described with reference to FIGS. 4a and 4b, each of which shows an enlarged shape of a cross-section of the small side of a rectangular waveguide. The shapes are shown as they are when they come from the casting process. The right-hand and left-hand small sides have shapes that are symmetrical with respect to a plane perpendicular to the large sides of the waveguide.

In both cases, the distance to be obtained between the two small sides is equal to 15 mm±0.02 mm.

The example pertains to a case where the final dimension is obtained by peening.

Figure 5:
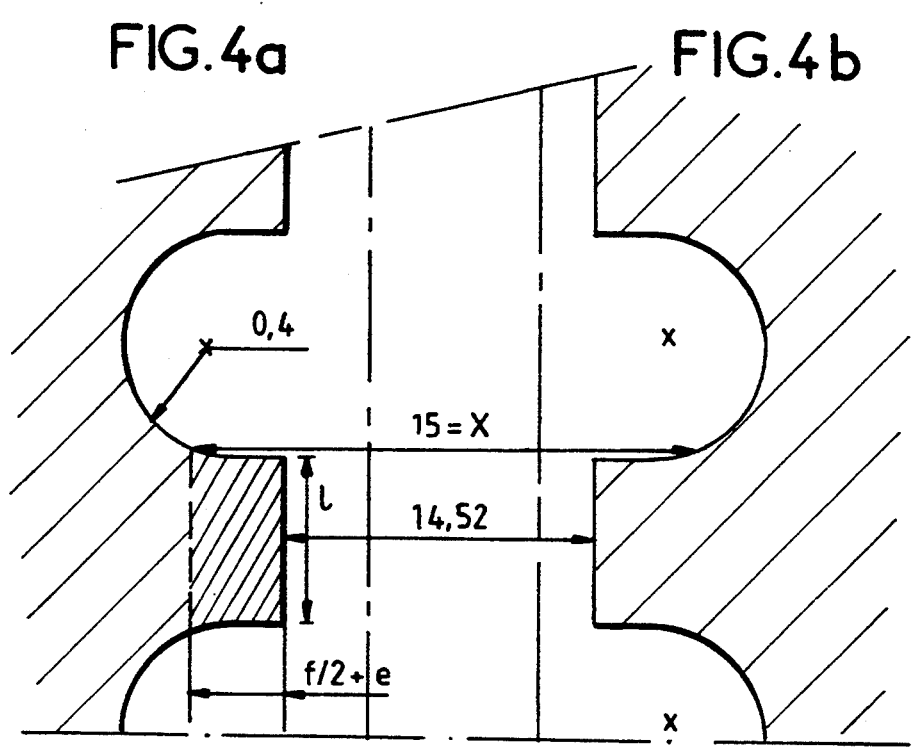
FIG. 5 shows an enlargement of a part of FIG. 4, designed to explain the relationships between the dimensions of the bumps and those of the grooves.

The maximum value of the dimension obtained should not be greater than 15.02 mm. The minimum value given to the caster for the distance between the facing tips of bumps on each of the small sides will be 14.52 mm. This value is computed as follows:

The computation starts with a maximum value of 15.02. Twice 0.05=e, i.e. 0.10 mm, is removed because there should be a minimum of 0.05 mm of material to be peened There is a further removal of twice $$0,2 = \frac{f}{2}$$

giving 0.4 which corresponds to the precision JS 14 for this dimension and this shape. Under these conditions, the bumps of the element as cast will be at a minimum distance of 14.52 mm and a maximum distance of 14.52+0.4=14.92 mm from one another. We shall now look at what happens when the casting is delivered with the minimum value of 14.52. During the passing of the tool, the material constituting the grooves will be chased into the grooves. The grooves should therefore have sufficient volume to receive the material thus chased. In the particular exemplary embodiment, the cross-sections of the grooves are semicircular. They are shown in greater detail in FIG. 5. The height of the bump is 1.

When the distance between two facing bumps is the minimum, i.e. 14.52 mm, the bump width that will be peened has the dimension:

$$\frac{f}{2} + e$$

The surface area of the bump that will be peened has substantially the value:

$$\left(\frac{f}{2} + e\right)l$$

If R designates the value of the radius of the groove, the centers of the circles defining the groove being located at a distance 15 mm=X from each other, the surface area of a groove is:

$$\pi \frac{R^2}{2}$$

The dimensions R and 1 must verify the relationship:

$$\frac{\pi R^2}{2} > \left(\frac{f}{2} + e\right)l \qquad (1)$$

Figures 4A, 4B:
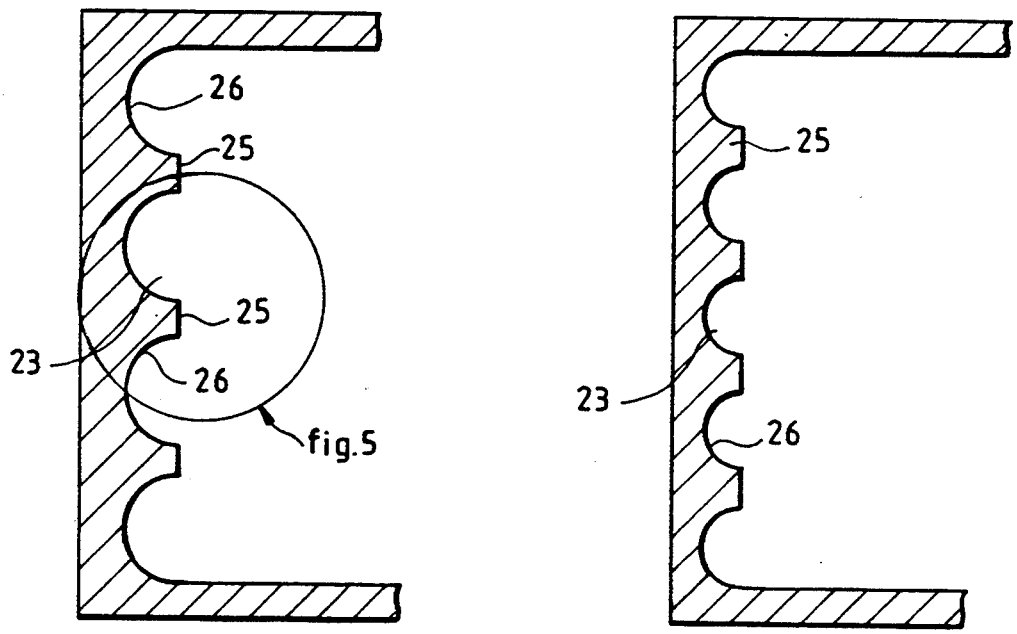
FIGS. 4a and 4b show partial views of cross-sections of two particular exemplary embodiments.

In the exemplary embodiment, grooves have been taken with a radius of 0.4 (FIG. 4a) and 0.3 (FIG. 4b).

The heights 1 for their part are equal to about 0.3 mm and 0.2 mm respectively. It is observed furthermore that FIG. 4a has three bumps 25 and four grooves 26, FIG. 4b has four bumps 25 and five grooves 26. In both cases, the relationship 1 is verified since:

$$\pi \frac{0,4 \times 0,4}{2} > 0,3 \times (0,2 + 0,05)$$

giving $$\pi \times 0,08 > 0,075 \qquad \text{FIG. } 4a$$

and $$\pi \frac{0.3 \times 0.3}{2} > 0.2 \times (0.2 + 0.05)$$

$$\pi \times 0.045 > 0.05$$

FIG. 4b

The above computation is made without taking account of the fact that the peened material gets compressed. The fact that each bump is in between two grooves and that, consequently, there is an additional groove facilitates the dimensioning operations and makes it easier to obtain the casting. It is indeed seen that, in the case of a rectangular waveguide, the connection between the small side and the large side is done on a groove. In the case of a circular waveguide, the symmetry would result in there being as many grooves as bumps.

What is claimed is:

1. A method for the manufacture of a waveguide or part of a waveguide from a casting, said waveguide comprising a plurality of walls, at least one part along which first and second walls of said waveguide are parallel and a spacing between said first and second walls equal to a distance X with a tolerance x and a caster tolerance value for the distance X being f, said method comprising,
   a) casting a form having an inner part conforming in shape with at least one of said first and second walls and comprising embossed features and grooves, wherein a cross-sectional surface area of a groove is greater than a maximum total cross-sectional surface area that the embossed features may have according to the tolerance f, and
   b) reducing said embossed features by passing a tool through said waveguide and parallel to said first and second walls.
2. A method according to claim 1, wherein the tool for reducing the embossed features is a chasing tool.
3. A method according to claim 1, wherein the tool for reducing the embossed features is a peening tool.
4. A method according to claim 1, wherein the tool for reducing the embossed features is a broach.
5. A method according to claim 1, wherein the embossed features are constituted by longitudinal bumps whose longitudinal lines are parallel to the first and second walls.

* * * * *